(12) United States Patent
Han et al.

(10) Patent No.: US 10,114,889 B2
(45) Date of Patent: Oct. 30, 2018

(54) SYSTEM AND METHOD FOR FILTERING KEYWORDS

(71) Applicant: BEIJING QIHOO TECHNOLOGY COMPANY LIMITED, Beijing (CN)

(72) Inventors: Menggang Han, Beijing (CN); Tiejun Li, Beijing (CN); Xuping Liu, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 734 days.

(21) Appl. No.: 14/411,465

(22) PCT Filed: May 15, 2013

(86) PCT No.: PCT/CN2013/075649
§ 371 (c)(1),
(2) Date: Dec. 26, 2014

(87) PCT Pub. No.: WO2014/000519
PCT Pub. Date: Jan. 3, 2014

(65) Prior Publication Data
US 2015/0339378 A1    Nov. 26, 2015

(30) Foreign Application Priority Data

Jun. 27, 2012 (CN) .......................... 2012 1 0218551

(51) Int. Cl.
*G06F 17/30* (2006.01)
(52) U.S. Cl.
CPC .. *G06F 17/30699* (2013.01); *G06F 17/30864* (2013.01)

(58) Field of Classification Search
CPC ..................... G06F 17/30699; G06F 17/30864
(Continued)

(56) References Cited

U.S. PATENT DOCUMENTS

| 5,138,668 | A | * | 8/1992 | Abe ....................... | G06K 9/348 382/177 |
| 8,713,007 | B1 | * | 4/2014 | Korolev ................. | G06N 5/048 707/729 |

(Continued)

FOREIGN PATENT DOCUMENTS

| CN | 1350246 A | 5/2002 |
| CN | 1403965 A | 3/2003 |

(Continued)

*Primary Examiner* — James Trujillo
*Assistant Examiner* — Jessica N Le
(74) *Attorney, Agent, or Firm* — Baker & Hostetler LLP

(57) ABSTRACT

Techniques for filtering information are described herein. In accordance with the present disclosure, a text acquisition module is configured to acquire text content to be filtered and a scanning module is configured to scan the text content to be filtered. The disclosed techniques scan the text content through a preset keyword dictionary, record a position of each keyword in the text content and acquire character pitch between keywords in the text content according to the position of each keyword in text content. A pitch judgment module is configured to judge whether the character pitch exceeds a preset character pitch and filter the keyword(s) in the text content in response to a determination that the character pitch exceeds the preset character pitch.

9 Claims, 4 Drawing Sheets

(58) Field of Classification Search
USPC .......................................................... 707/709
See application file for complete search history.

(56) References Cited

U.S. PATENT DOCUMENTS

| | | | |
|---|---|---|---|
| 2005/0060273 A1* | 3/2005 | Andersen | G06F 17/30619 |
| 2005/0138109 A1* | 6/2005 | Redlich | G06F 17/30699 |
| | | | 709/201 |
| 2008/0178302 A1* | 7/2008 | Brock | G06F 17/30864 |
| | | | 726/32 |
| 2009/0034851 A1* | 2/2009 | Fan | G06F 17/30029 |
| | | | 382/230 |
| 2010/0082332 A1* | 4/2010 | Angell | G06F 17/2735 |
| | | | 704/9 |
| 2010/0082592 A1* | 4/2010 | Ruvini | G06Q 30/08 |
| | | | 707/706 |
| 2010/0268628 A1* | 10/2010 | Pitkow | G06F 21/10 |
| | | | 705/34 |
| 2010/0299322 A1 | 11/2010 | Zhang | |
| 2011/0173037 A1* | 7/2011 | Attenberg | G06Q 30/02 |
| | | | 705/7.11 |
| 2012/0096514 A1* | 4/2012 | Tuscano | G06F 17/3089 |
| | | | 726/1 |
| 2012/0221588 A1* | 8/2012 | Wen | G06F 17/30637 |
| | | | 707/758 |

FOREIGN PATENT DOCUMENTS

| | | |
|---|---|---|
| CN | 101472250 A | 7/2009 |
| CN | 102779176 A | 11/2012 |

* cited by examiner

SYSTEM AND METHOD FOR FILTERING KEYWORDS

CROSS-REFERENCE TO RELATED APPLICATIONS

This application is the National Stage of International Application No. PCT/CN2013/075649, filed May 15, 2013, which claims the benefits of Chinese Patent Application No. 201210218551.6, filed Jun. 27, 2012, the disclosures of which are incorporated herein by reference in their entireties.

TECHNICAL FIELD

The present invention relates to the technical field of network information filtering, and especially to a system and a method for filtering keywords.

BACKGROUND OF THE INVENTION

In the age of web 2.0, contents created by Internet users are very broad. A large amount of text contents are generated on the Internet every day, such as, posts on BBS (Bulletin Board System) forum, articles on Blogs and text information on the newly booming Micro-blog. The text contents created by users cover almost everything. However, some of contents involve eroticism, fraud and politically sensitive information. Such contents may affect on-line experience of readers or lead to mental or even economic damages. Therefore, it is urgent for each ICP (Forum, Blog or Micro-blog provider) to effectively and timely filter the data created by users, thereby cleaning forum data and improving user experiences.

In the prior arts, in order to filter the contents containing sensitive information timely, a common method is a scanning technique based on keyword contents, which is particularly scanning keyword(s) related to sensitive information. For example, the keywords such as "eroticism gate", "sex picture", and "surreptitious photograph" may be scanned to find a post related to "eroticism gate". By scanning text contents of the post, once any of the mentioned keywords is found in the text contents, it would be decided that the contents contain sensitive information related to "eroticism gate". However, during the posting of text contents in practice, some users would purposely "subtly" modify the text contents to be posted in order to avoid censorship and filtering. Taking the keyword "eroticism gate" as an example, a user can modify the keyword "eroticism gate" in the text content to be posted to variants such as "eroX gate", "ero ○ gate", "ero tici sm gate", "eroxticismxgate", "erox0tici0sm gate", "ero***ticism************* gate".etc. Although these variants could have no influence on reader's understanding of the text content, they can easily be skipped by the scanning sensitive information in the text contents based on keyword scanning techniques in the prior arts. Then, the eroticism, fraud and politically sensitive information could be successfully posted, resulting in the failure of the scanning techniques based on keyword content in the prior arts.

SUMMARY OF THE INVENTION

In consideration of the aforementioned problems, the present invention is proposed to provide a system and a method for filtering keywords that will overcome above problems, or at least partially solve or relieve above problems.

According to one aspect of the present invention, there is provided a system for filtering keywords, which comprises:
a text acquisition module configured to acquire text content to be filtered;
a scanning module configured to scan the text content to be filtered through a preset keyword dictionary, if the text content to be filtered contains keyword(s) stored in the preset keyword dictionary, record a position of each keyword in the text content to be filtered and acquire character pitch between keywords in the text content to be filtered according to the position of each keyword in the text content to be filtered; and
a judging and filtering module configured to judge whether the character pitch exceeds a preset character pitch, if not, filter the keyword(s) in the text content to be filtered.

According to another aspect of the present invention, there is provided a method for filtering keywords, which comprises steps of:
acquiring text content to be filtered;
scanning the text content to be filtered through a preset keyword dictionary, if the text content to be filtered contains keyword(s) stored in the preset keyword dictionary, then recording position of each keyword in the text content to be filtered and acquiring character pitch between keywords in the text content to be filtered according to the position of each keyword in the text content to be filtered; and
judging whether the character pitch exceeds a preset character pitch, if not, filtering the keywords in the text content to be filtered.

According to another aspect of the present invention, there is provided a computer program which comprises computer readable codes, wherein a server executes the method for filtering keywords according to any one of claims 9-16 when the computer readable code is operated on the server.

According to another aspect of the present invention, there is provided a computer readable medium, which stores the computer program according to claim 17.

The beneficial effects of the present invention are:

The present invention may improve identification capability for sensitive information and improve filtering adaptability for the sensitive information by obtaining the character pitch between the keywords in the text content to be filtered and judging the character pitch.

The above descriptions are merely an overview of the technical solution of the present invention. In order to more clearly understand the technical solution of the present invention to implement in accordance with the contents of the specification, and to make the foregoing and other objects, features and advantages of the present invention more apparent, detailed embodiments of the present invention will be provided below.

BRIEF DESCRIPTION OF THE DRAWINGS

Through reading the detailed descriptions of the following preferred embodiments, it will be obvious for those skilled in the art to understand all the other benefits and advantages. The drawings are only provided for the purpose of illustrating the preferred embodiments and should not be considered as any limitations on the present invention. Throughout the drawings, the same component will be indicated by the same reference number. In the drawings.

EMBODIMENTS

Hereafter, the present invention will be further described in connection with the drawings and the specific embodiments.

Figure 1:
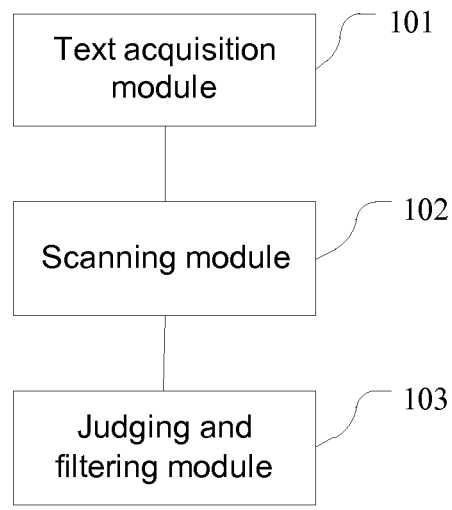
FIG. 1 schematically shows a block diagram of a system for filtering keywords according to one embodiment of the present invention.

FIG. 1 is a block diagram of a system for filtering keywords according to one embodiment of the present invention. With reference to FIG. 1, the system comprises:

a text acquisition module 101 configured to acquire text content to be filtered. In this embodiment, the text acquisition module 101 may use a network spider to capture web page(s) to acquire the text content to be filtered. Also, by receiving the texts to be filtered (that is, the text to be posted received by an information service system such as Forum, Blog and Micro-blog), the text content to be filtered may be acquired;

a scanning module 102 configured to scan the text content to be filtered through a preset keyword dictionary, if the text content to be filtered contains keyword(s) stored in the preset keyword dictionary, record a position of each keyword in the text content to be filtered and acquire the character pitch between the keywords in the text content to be filtered according to the position of each keyword in the text content to be filtered; and a judging and filtering module 103 configured to judge whether the character pitch exceeds a preset character pitch, if not, filter the keyword(s) in the text content to be filtered.

Preferably, the keywords would be words or single characters that constitute sensitive information. The preset keyword dictionary stores all the keywords that need to be filtered out.

If the sensitive information is multiple words formed by a plurality of words, for example, when three words "America", "bus", "explosion" exist independently, there may not be contained any sensitive information. However, if these three words appear simultaneously in a section of the text, there may be possibly constituted sensitive information. Generally, it is discrete type information without an ordering sequence when the sensitive information is a phrase formed by a plurality of words. In this case, the character pitch is very large, and the sensitive information could still be reflected even when words appear simultaneously throughout an article. In order to recognize the multiple words, in this embodiment, each word in the multiple words is regarded as a keyword; it is assumed that the keyword dictionary contains three keywords: "America", "bus" and "explosion", the corresponding preset character pitch of which is 50 and is assumed that a scanning result (the format of scanning result —"keyword": position) is "bus": 34, "America": 48, "explosion": 57.

The three words of "America", "bus" and "explosion" all appear in the scanning result and the character pitch between any two words is smaller than 50. Thus, the text content to be filtered are recognized as containing the sensitive information constituted by the three keywords, so as to filter the text content to be filtered or wait for manual review.

Figure 2:
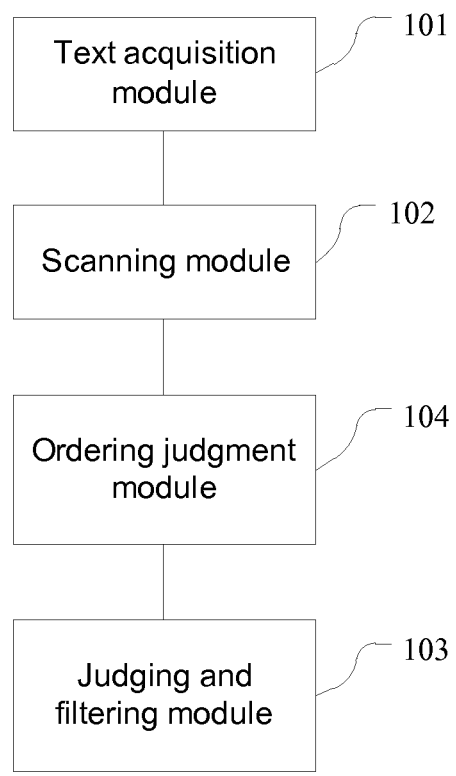
FIG. 2 schematically shows a block diagram of a system for filtering keywords according to another embodiment of the present invention.

Preferably, if the keywords are single characters constituting sensitive information, with reference to FIG. 2, the system further comprises:

an ordering judgment module 104 configured to judge whether each keyword satisfies the ordering sequence according to the positions of each keyword in the text content to be filtered, wherein the ordering sequence means whether each keyword is arranged in an order.

The keyword dictionary also stores a preset ordering sequence of the keywords.

Preferably, the ordering judgment module particularly comprises:

a sequence acquisition sub-module configured to acquire the sequence of the keywords according to the position of each keyword in the text content to be filtered; and an ordering matching sub-module configured to match the sequence of the keywords with the preset ordering sequence of the keywords in the keyword dictionary, if matched successfully, determine that the keywords satisfy the ordering sequence.

The sensitive information may be a phrase, for example, "eroticism gate". Generally, it is vector type information with an ordering sequence when the sensitive information is a phrase. The keywords constituting the sensitive information are necessarily ordered in a sequence so as to reflect the sensitive information. Thus, in order to recognize the processed phrase, this embodiment may divide the phrase into single characters and each of characters may be used as keywords. It is assumed that the keyword dictionary contains three keywords: "erotic", "ism", "gate", the corresponding character pitch of which is 10 and the ordering sequence in the keyword dictionary is set as "erotic", "ism" and "gate"; and it is assumed that the scanning result in the text content to be filtered (the format of scanning result—"keyword": position) is "ism": 67, 77, "erotic": 87, "gate": 90.

The three keywords "erotic", "ism" and "gate" all appear in the scanning results. However, the keywords appear in the text content to be filtered in a sequence as: ism (67)-> ism (77)-> eroti (87)-> gate (90) and the format of the sequence—"keyword" (position) does not follow the preset sequence. Thus, the sensitive information "eroticism gate" is not identified in the text content to be filtered.

Moreover, since the phrase may also be expressed by omitting parts of phrase, for example, "erotiX gate", "eroti◯ gate" that can also reflect the sensitive information, a method having stronger recognition but with a relatively high misjudgment rate can be used to perform the identification. The relevant method is as follows: assuming the keyword dictionary contains three keywords: "erotic", "ism", "gate", the corresponding preset character pitch of which is 10, and the ordering sequence in the keyword dictionary includes: (1) "erotic", "ism"; (2) "erotic", "gate"; (3) "ism", "gate"; and assuming the scanning result in the text content to be filtered (the format of scanning result—"keyword": position) is: "ism": 67, 77, "erotic": 87, "gate": 90.

The three keywords "erotic", "ism" and "gate" all appear in the scanning results. However, the keywords in the text content to be filtered in sequence as: "ism" (67)->"ism" (77)->"erotic" (87)->"gate" (90). Upon judging, (2) and (3) of the ordering sequence are satisfied and the character pitch between "erotic" (87)->"gate" (90) is shorter than the preset character pitch. Thus, the sensitive information "eroticism gate" is identified in the text content to be filtered, so that it is necessary to filter the text content to be filtered or wait for manual review.

Figure 3:
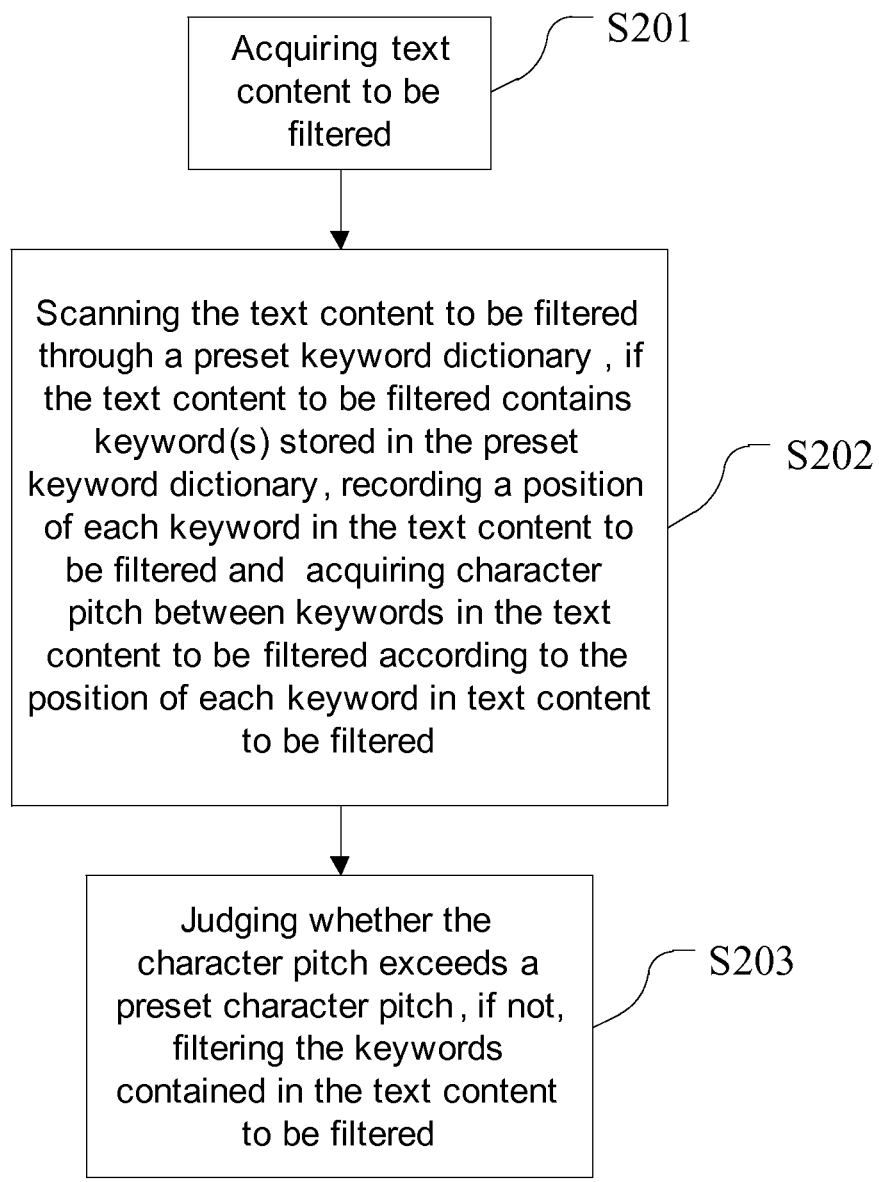
FIG. 3 schematically shows a flow chart of a method for filtering keywords according to one embodiment of the present invention.

FIG. 3 is a flow chart of the method for filtering keywords according to one embodiment of the present invention. With reference to FIG. 3, the mentioned method comprises the following steps:

S201: acquiring text content to be filtered. In this embodiment, a network spider can be used to capture web page(s) to acquire the text content to be filtered. Also, by receiving the text to be filtered (that is, the texts to be posted received by an information service system such as Forum, Blog and Micro-blog), the text content to be filtered may be acquired;

S202: scanning the text content to be filtered through a preset keyword dictionary, if the text content to be filtered contains keyword(s) stored in the preset keyword dictionary, recording a position of each keyword in the text content to be filtered and acquiring character pitch between keywords in the text content to be filtered according to the position of each keyword in text content to be filtered; and S203: judging whether the character pitch exceeds a preset character pitch, if not, filtering the keywords contained in the text content to be filtered.

At Step S202, if the text content to be filtered contains no keywords stored in the preset keyword dictionary, the process may directly end;

At Step S203, if yes, the process may directly end.

Preferably, the keywords would be words constituting sensitive information and the preset keyword dictionary stores all the keywords that need to be filtered out.

Preferably, the keywords would be single characters constituting sensitive information and the preset keyword dictionary stores all the keywords that need to be filtered out.

Figure 4:
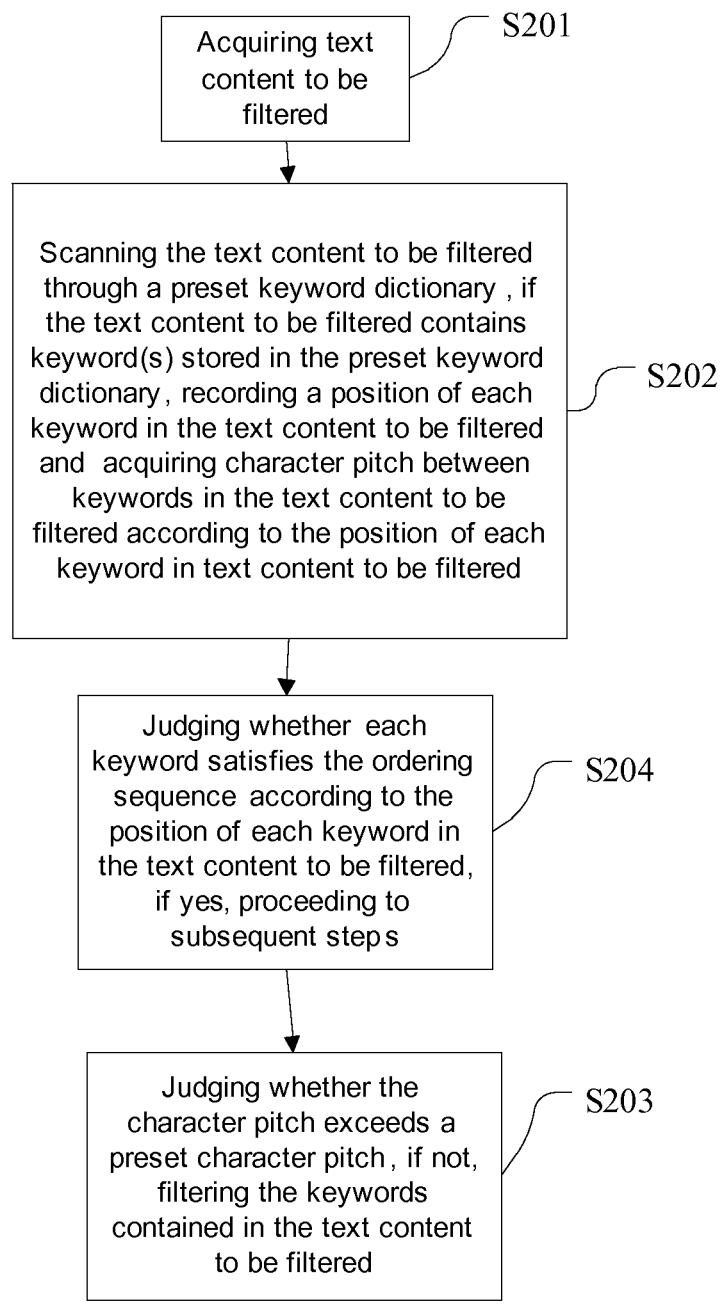
FIG. 4 schematically shows a flow chart of a method for filtering keywords according to another embodiment of the present invention.

With reference to FIG. 4, preferably, before Step 203, the method may further comprise:

S204: judging whether each keyword satisfies the ordering sequence according to the position of each keyword in the text content to be filtered, if yes, proceeding to subsequent steps.

Preferably, the keyword dictionary also stores a preset ordering sequence of the keywords.

Preferably, when judging whether each keyword satisfies the ordering sequence, the method particularly comprises:

acquiring the sequence of the keywords according to the position of each keyword in the text content to be filtered; and matching the sequence of the keywords with the preset ordering sequence of the keywords in the keyword dictionary, if matched successfully, determining that the keywords satisfy the ordering sequence.

It should be noted that, in each component or element of the system according to the present invention, the components or elements are classified logically in terms of the function to be realized. Nevertheless, the present invention is not limited thereto and each component or element can be reclassified and reassembled as necessary. For example, some of components can be assembled into a single component or some of components can be disassembled into more subcomponents.

Each member embodiment of the present invention can be realized by hardware, or realized by software modules running on one or more processors, or realized by the combination thereof. A person skilled in the art should understand that a microprocessor or a digital signal processor (DSP) may be used in practical use to realize some or all the functions of some or all the members of the system for filtering keywords according to the embodiments of the present invention. The present invention may be further realized as some or all the equipments or device programs for executing the methods described herein (for example, computer programs and computer program products). Such a program for realizing the present invention may be stored in computer readable medium, or may have one or more signal forms. These signals may be downloaded from the Internet website, or be provided by carrying signals, or be provided in any other manners.

Figure 5:
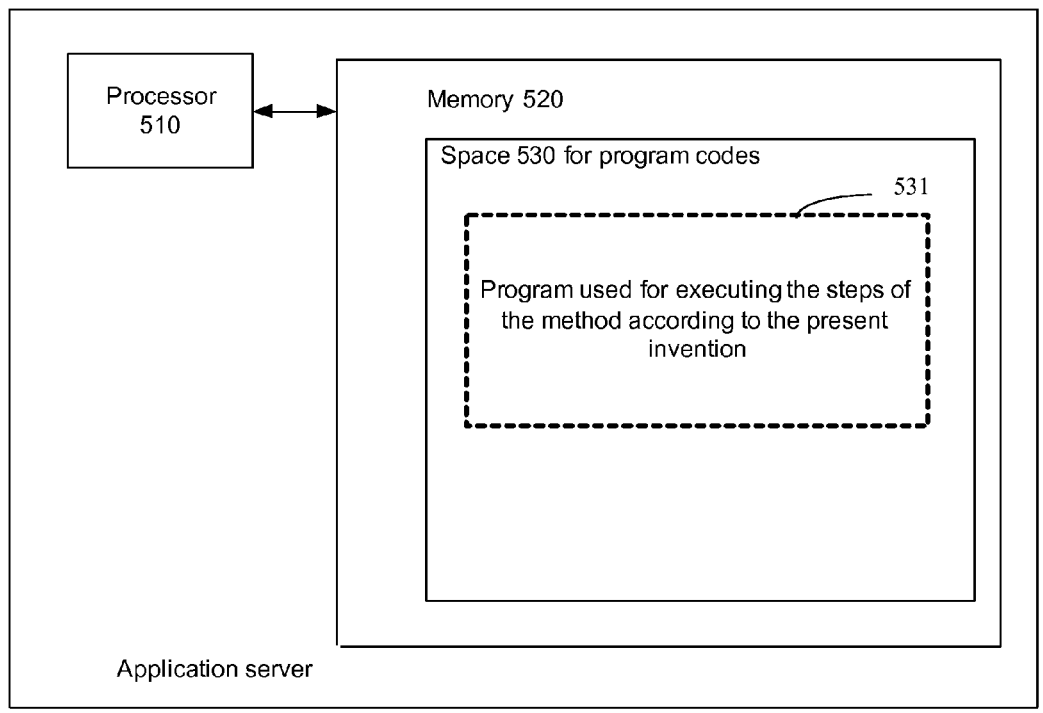
FIG. 5 schematically shows a block diagram of a server used for executing the method according to the present invention.
Figure 6:
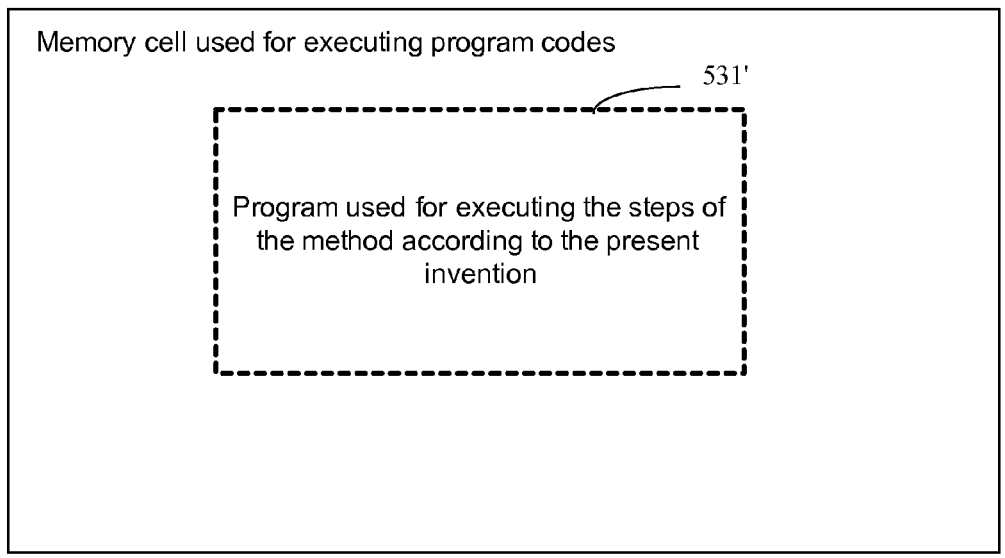
FIG. 6 schematically shows a memory cell used for holding or carrying program codes for realizing the method according to the present invention.

For example, FIG. 5 shows a server which may realize the method for filtering keywords according to the present invention, such as an application server. The server traditionally comprises a processor 510 and a computer program product or a computer readable medium in form of a memory 520. The memory 520 may be electronic memories such as flash memory, EEPROM (Electrically Erasable Programmable Read-Only Memory), EPROM, hard disk or ROM. The memory 520 has a memory space 530 for executing program code 531 of any methodic steps of the above method. For example, the memory space 530 for program code may comprise various program codes 531 of respective step for realizing the above mentioned method. These program codes may be read from or written into one or more computer program products. These computer program products comprise program code carriers such as hard disk, compact disk (CD), memory card or floppy disk. These computer program products are usually the portable or stable memory cells as shown in reference FIG. 6. The memory cells may have memory sections, memory spaces, etc., which are arranged similar to the memory 520 of the server as shown in FIG. 5. The program codes may be compressed in an appropriate manner. Usually, the memory cell includes computer readable codes 531', i.e., the codes can be read by processors such as 510. When the codes are operated by the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of present invention may be implemented without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets form no limit to the claims. The wording "comprising" is not meant to exclude the presence of elements or steps not listed in a claim. The wording "a" or "an" in front of element is not meant to exclude the presence of a plurality of such elements. The present invention may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as names.

Also, it should be noticed that the language used in the present specification is chosen for the purpose of readability and teaching, rather than for the purpose of explaining or defining the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. An improved information filtering system for filtering out sensitive information from content, which comprises:
    a processor; and
    a memory communicatively coupled to the processor and storing instructions that upon execution by the processor cause the system to:
    acquire text content;
    scan the text content through a preset keyword dictionary;
    in response to a determination that the text content contains a plurality of keywords stored in the preset keyword dictionary, determine a position of each of the plurality of keywords in the text content;
    determine at least one character pitch between any two of the plurality of keywords in the text content based on the position of each keyword among the plurality of keywords, wherein the at least one character pitch is a difference between positions of any two of the plurality of keywords in the text content;
    determine whether the at least one character pitch does not exceed a preset character pitch;
    in response to a determination that the at least one character pitch does not exceed the preset character pitch, filter out the plurality of keywords from the text content;
    wherein the preset keyword dictionary further stores a preset order of at least two keywords among all of the keywords that need to be filtered out; and
    wherein the memory further stores instructions that upon execution by the processor cause the system to:
        determine the order of the plurality of keywords according to the position of each keyword among the plurality of keywords in the text content,
        compare the order of the plurality of keywords in the text content with the preset order of corresponding keywords stored in the keyword dictionary, and
        when the order of the plurality of keywords in the text content matches the preset order of the corresponding keywords stored in the keyword dictionary, determine that the plurality of keywords satisfy the preset order.

2. The system according to claim 1, wherein the plurality of keywords are words constituting sensitive information and the preset keyword dictionary stores all of keywords that need to be filtered out.

3. The system according to claim 1, wherein the memory further stores instructions that upon execution by the processor cause the system to use a network spider to capture a web page to acquire the text content.

4. The system according to claim 1, wherein the memory further stores instructions that upon execution by the processor cause the system to acquire the text content by means of receiving the text content.

5. A method for improving sensitive information filtering, which comprises steps of:
    acquiring text content;
    scanning the text content through a preset keyword dictionary;
    in response to a determination that the text content contains a plurality of keywords stored in the preset keyword dictionary, determining a position of each of the plurality of keywords in the text content;
    determining at least one character pitch between any two of the plurality of keywords in the text content based on the position of each keyword among the plurality of keywords, wherein the at least one character pitch is a difference between positions of any two of the plurality of keywords in the text content;
    determining whether the at least one character pitch does not exceed a preset character pitch;
    in response to a determination that the at least one character pitch does not exceed the preset character pitch, filtering out the plurality of keywords from the text content;
    wherein the preset keyword dictionary further stores a preset order of at least two keywords among all of the keywords that need to be filtered out; and
    wherein the method further comprises:
        determining the order of the plurality of keywords according to the position of each keyword among the plurality of keywords in the text content,
        comparing the order of the plurality of keywords in the text content with the preset order of corresponding keywords stored in the keyword dictionary, and
        when the order of the plurality of keywords in the text content matches the preset order of the corresponding keywords stored in the keyword dictionary, determining that the plurality of keywords satisfy the preset order.

6. The method according to claim 5, wherein the plurality of keywords are words constituting sensitive information and the preset keyword dictionary stores all of keywords that need to be filtered out.

7. The method according to claim 5, wherein using a network spider to capture a web page to acquire the text content.

8. The method according to claim 5, wherein acquiring the text content by means of receiving the text content.

9. A non-transitory computer readable medium having instructions stored thereon that, when executed by at least one processor, cause the at least one processor to perform operations for filtering keywords, the operations comprising:
    acquiring text content;
    scanning the text content through a preset keyword dictionary;
    in response to a determination that the text content contains a plurality of keywords stored in the preset keyword dictionary, determining a position of each of the plurality of keywords in the text content;

determining at least one character pitch between any two of the plurality of keywords in the text content based on the position of each keyword among the plurality of keywords, wherein the at least one character pitch is a difference between positions of any two of the plurality of keywords in the text content;

determining whether the at least one character pitch does not exceed a preset character pitch;

in response to a determination that the at least one character pitch does not exceed the preset character pitch, filtering out the plurality of keywords from the text content;

wherein the preset keyword dictionary further stores a preset order of at least two keywords among all of the keywords that need to be filtered out; and wherein the operations further comprises:

determining the order of the plurality of keywords according to the position of each keyword among the plurality of keywords in the text content, comparing the order of the plurality of keywords in the text content with the preset order of corresponding keywords stored in the keyword dictionary, and when the order of the plurality of keywords in the text content matches the preset order of the corresponding keywords stored in the keyword dictionary, determining that the plurality of keywords satisfy the preset order.

* * * * *